June 29, 1971  A. G. FORTON ET AL  3,588,973
METHOD OF, AND APPARATUS FOR, POSITIONING STRETCHABLE WORKPIECES
Filed June 23, 1969  2 Sheets-Sheet 1

INVENTORS
Andrew G. Forton
BY Leonard E. York
Watson, Cole Grindle & Watson
ATTORNEY

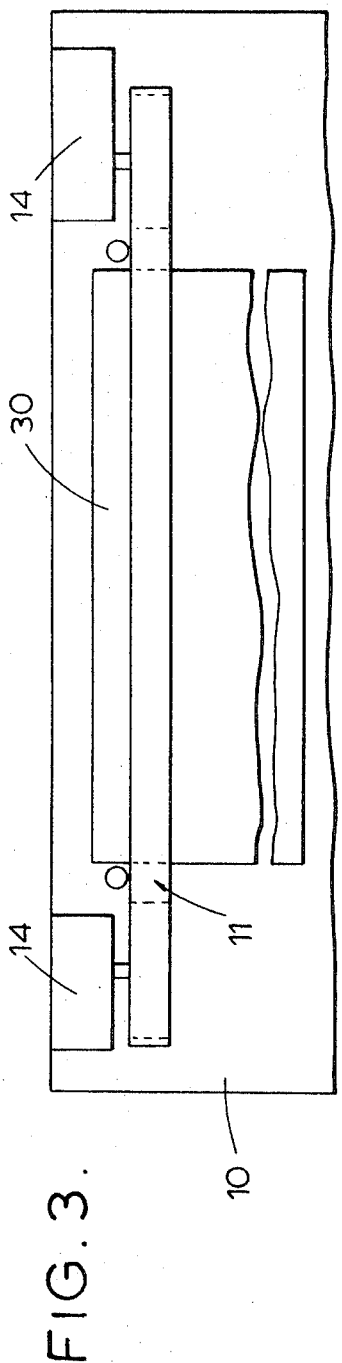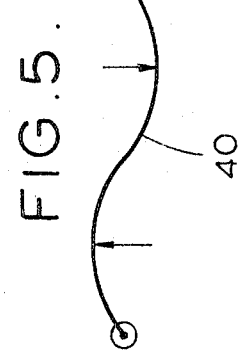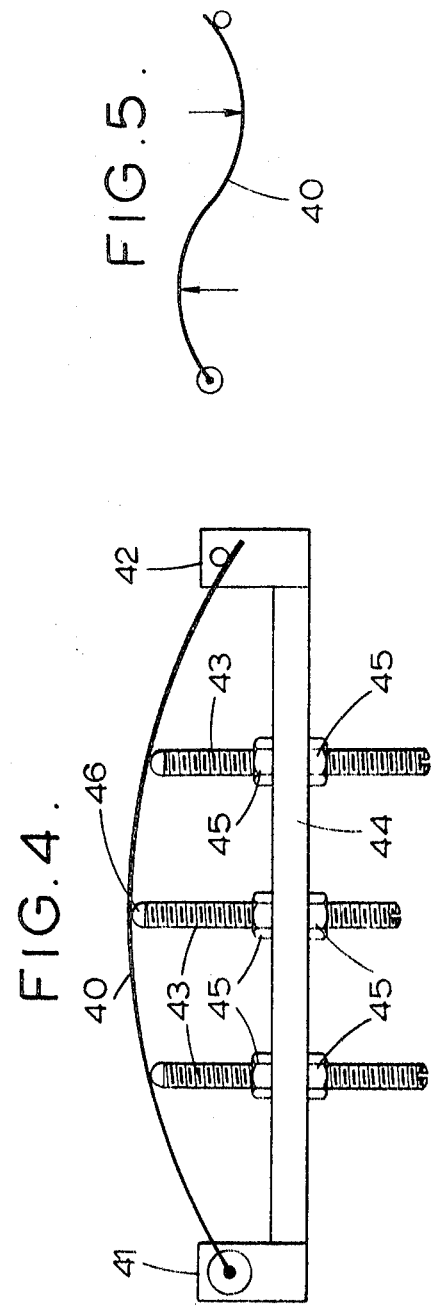

United States Patent Office 3,588,973
Patented June 29, 1971

3,588,973
METHOD OF, AND APPARATUS FOR, POSITIONING STRETCHABLE WORKPIECES
Andrew G. Forton, Chislehurst, and Leonard E. York, Oxted, England, assignors to British Scientific Instrument Research Association, Chislehurst, Kent, England
Filed June 23, 1969, Ser. No. 835,570
Claims priority, application Great Britain, June 25, 1968, 30,200/68
Int. Cl. D05b 35/10; D06c 21/00
U.S. Cl. 28—77
20 Claims

ABSTRACT OF THE DISCLOSURE

A method of, and apparatus for, positioning a stretchable sheet workpiece, such as a knitted or woven fabric, for subsequent joining to a further workpiece as by sewing.

A resilient belt entrained around rollers is placed over the workpiece and the lower run of the belt is distorted in a transverse direction towards an outer edge of the workpiece which edge is to be positioned. The distorted part of the belt is brought into contact with the workpiece near said edge and adheres thereto. Upon allowing the distorted part of the belt to revert to its natural state the workpiece is brought into a position where is outer edge lies along a straight line and this straightened edge can thereafter be brought into joining relationship with an edge of another workpiece.

BACKGROUND OF THE INVENTION

Where sheet workpieces are to be joined together as occurs frequently in the textile industries, with woven or knitted fabric, there is often a problem in correctly positioning the parts of the workpieces to be joined. This problem manifests itself most clearly where the parts to be joined are curved edges. In general there has been no satisfactory way to correctly position workpieces of this nature especially where the workpieces have curved edges which are to be joined.

A general object of the invention is to provide a method and apparatus for positioning sheet workpieces.

SUMMARY OF THE INVENTION

According to one aspect of the invention there is provided a method of positioning a stretchable sheet workpiece comprising the steps of aligning the workpiece with a resilient pre-stretched lamellar member so as to be in a superimposable non-contacting relationship therewith, distorting the lamellar member in a transverse direction towards an outer edge of the workpiece, contacting the workpiece with the distorted lamellar member so that it adheres thereto and allowing the distorted lamellar member to revert to its original state thereby causing the outer edge of the workpiece to lie along a straight line of predetermined length. In sequence, the alignment of the lamellar member with the workpiece can take place before or after the distortion of the lamellar member. The workpiece may be stretched a small amount by stretching the lamellar member in a longitudinal direction after the lamellar member has reverted to its original state. In a further step the outer edges of two workpieces can be brought into joining relationship with one another. The distorted straight outer edge of each workpiece may be normally straight or curved and the two workpieces to be joined may be identical or of dissimilar shape with their outer edges to be joined of equal or non-equal length.

The shape of the outer edge of the workpiece can be sensed prior to the distortion, by any known sensing means such as photoelectric detectors or a mechanical hydraulic or pneumatic device. The distortion can then take place in accordance with this sensed shape. By treating two workpieces by the aforementioned method their outer edges each brought into a straight line can be moved into joining relationship and joined as by sewing.

According to another aspect of the invention there is provided an apparatus for positioning a stretchable sheet workpiece, said apparatus comprising a working table for receiving the workpiece, at least one carriage assembly, means for mounting said carriage assembly for movement relative to said table, a resilient pre-stretchable lamellar member carried by said assembly and having an outer surface adapted to adhere to the workpiece, means for displacing said lamellar member towards the table to bring said outer surface into contact with said workpiece and means for distorting the lamellar member in a transverse direction and towards an outer edge of said workpiece prior to contact therewith. In operation, the lamellar member is distorted by said distorting means and brought into contact with the workpiece by the displacing means so that upon reversion to its normal state, the lamellar member causes the workpiece to be distorted so that its outer edge lies on a straight line of predetermined length.

Two carriage assemblies can be provided to enable two workpieces to be positioned for subsequent joining. The outer surface of the lamellar member can be provided with a gripping element to adhere to the workpiece although depending upon the nature of the member and the workpiece this may not be necessary.

In accordance with a preferred embodiment the lamellar member is an endless belt entrained around rollers which rollers are relatively displaceable to stretch the belt. Stop members can extend vertically to abut the outer edge of the lamellar member adjacent the outer edge of the workpiece.

The means for distorting the lamellar member is preferably in the form of a template having a working surface corresponding in shape to the outer edge of the workpiece. Where workpieces of various shapes are involved it is desirable for the working surface of the template to be altered in shape.

The invention may be understood more readily, and various other features of the invention may become more apparent, from consideration of a constructional embodiment thereof.

BRIEF DESCRIPTION OF DRAWING

A constructional embodiment of the invention will now be described by way of example only with reference to the accompanying drawing, wherein:

FIG. 3 is a view generally corresponding to FIG. 2 at a second stage in the operation;

FIG. 4 is a plan view of an alternative type of template for use in the apparatus of FIG. 1; and FIG. 5 is a view corresponding to that of FIG. 4 and illustrating diagrammatically a further type of template.

DESCRIPTION OF PREFERRED EMBODIMENT

Figure 1:
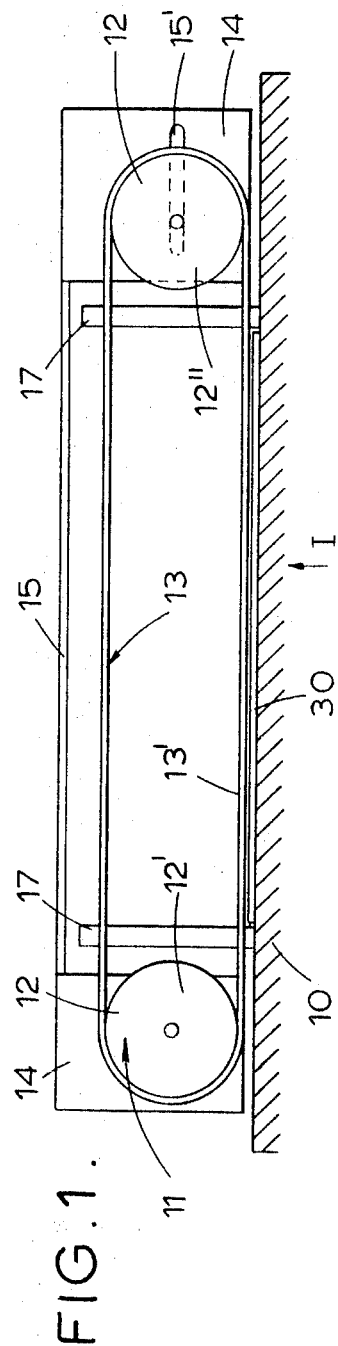
FIG. 1 is a side elevation of part of an apparatus made in accordance with the invention, the view being taken in the direction of arrow A of FIG. 2.
Figure 2:
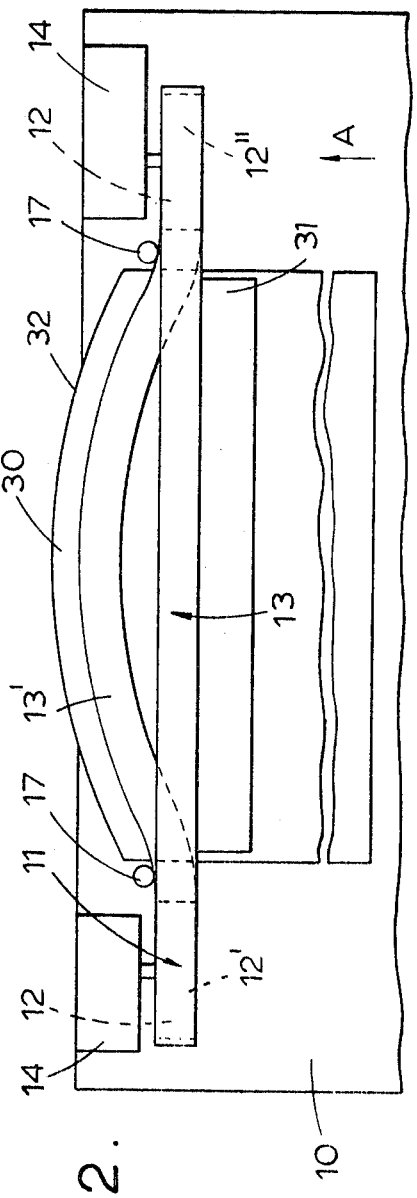
FIG. 2 is a plan view of the part shown in FIG. 1 at a first stage in its operation.

As shown in FIGS. 1 to 3, the apparatus has a working table 10 on which there are mounted two similar carriage assemblies. Only one of these assemblies, designated 11, is shown in the drawing.

The assembly 11 has two rollers or wheels 12 over which a resilient lamellar member in the form of an endless belt 13 is entrained. The belt 13 can be made from rubber or a similar resilient material. The outer surface of the belt 13 may be provided with gripping elements such as hooks as will be mentioned hereinafter. The rollers 12 are carried on mounting parts 14 which are joined by a bar 15. The assembly 11 as a whole is displaceable relative to the table 10. While the rotational axis of one roller 12' is fixed the rotational axis of the other roller 12" can be displaced in a horizontal plane to stretch the belt 13. This can be accomplished by mounting the shaft of the roller 12" in a slot 15' in the associated mounting part 14', the slot 15' extending longitudinally of the belt 13. Two stop members 17 extend vertically from the working table 10 and abut the outer edges at one side of the belt 13. One or both of these members 17 can be moved longitudinally of the belt 13 if so desired. Means is provided to displace the lower run 13' of the belt 13 towards the table 10 and this means can take various forms for example a lever mechanism, an electro magnetic device or simply weighted members placed onto the upper surface of the lower run 13' of the belt 13. Finally, it should be mentioned that a separate template, the purpose of which will become apparent from the following description, is needed to complete the apparatus.

The operation of the apparatus will now be described.

It is assumed that two stretchable workpieces with curved edges are to be sewn together. One of the workpieces 30 is placed in the desired position on the table 10 beneath the carriage assembly 11 and it is to be understood that the other workpiece is also placed beneath the other carriage assembly and the same sequence of operations now described carried out thereon. The carriage assembly 11 is moved into the correct operative position and a template 31 having a working edge of corresponding shape to the curved edge 32 of the workpiece 30 is brought into co-planar engagement with the lower run 13' of the belt 13. The template 31 is moved in the direction of arrow A to distort the lower run of the belt 13 to the shape of the curved edge 32 of the workpiece 30 as shown in FIG. 2. The distorted lower run of the belt 13 is then lowered into contact with the workpiece 30 by suitable displacing means such as the aforementioned weighted elements and the contacting surface of the belt 13 adheres to the workpiece 30. It is preferable that the outer surface of the belt 13 be provided with gripping elements such as plastic or metallic hooks or pins or alternatively the outer surface can have a suitable texture such that it will adhere to the workpiece 30. However, depending upon the nature of the workpiece 30 and the belt 13, special provisions may not always be necessary. The template 31 is now withdrawn and the lower run of the belt 13 reversed to its former position and causes the curved edge 32 of the workpiece 30 to be formed into a straight line as shown in FIG. 3. Any puckering in the workpiece 30 at this stage can be removed by displacing the axis of the roller 12" outwards so as to stretch both the belt 13 and the workpiece 30.

With the workpiece maintained in the position shown in FIG. 3 the carriage assemblies are brought together so that the two workpieces are brought into edge to edge contact suitable for joining together. The two workpieces need not be identical in shape and either of the workpieces can have a straight outer edge and not be curved as shown. The amount of stretching of the individual workpieces can be compensated by displacing the rollers 12" of the carriage assemblies by different amounts so that the mating edges of the stretched workpieces have the same length.

The template 31 is shown to be a standard shape corresponding to that of the workpiece in question. Where an apparatus is to be used with workpieces of different shapes, a variable template such as that shown in FIG. 4 may be more desirable.

As shown in FIG. 4, the template is in the form of a flexible steel strip 40 carried at its end on mounting blocks 41, 42. One end of the strip 40 pivots about a fixed axis whereas the other end can slide relative to its own pivotal axis.

A number, in this case three, of displaceable adjustment elements 43 are mounted on a rod 44 extending between the blocks 41, 42. Each element 43 has an abutment face 44 which can be brought into engagement with the inner surface of the strip 40 to urge the latter to adopt the desired shape. Each element 43 in this example extends throughout the rod 44 and has a threaded portion which receives nuts 45 which are used to displace the abutment face 44 of the element 43 relative to the strip 40.

As shown in FIG. 4 the strip 40 is bent into an arcuate form. However it is possible that a strip having a more complex curvature such as a sinuous formation as shown in FIG. 5 may be required. In this case the strip 40 is subjected to two or more adjustable opposed forces as shown by the arrows X and Y which can be produced by adjustable elements 43 carried on two rods 44. The operation of the apparatus with the templates shown in FIGS. 4 and 5 is the same as hereinbefore described.

Within the scope of this invention it is possible for the entire positioning and/or subsequent sewing process to be made automatic. To this end sensing means (electrically, optically, mechanically, pneumatically or hydraulically operated) can determine the shape of the outer edges of the workpieces to be joined and control means can distort the belts of the carriage assemblies in accordance with the sensed shape.

We claim:

1. A method of positioning a stretchable sheet workpiece comprising the steps of:
    (a) aligning the workpiece with a resilient pre-stretched lamellar member so as to be in a superimposable non-contacting relationship therewith;
    (b) distorting the lamellar member in a transverse direction towards an outer edge of the workpiece;
    (c) contacting the workpiece with the distorted lamellar member so that it adheres thereto; and
    (d) allowing the distorted lamellar member to revert to its original state thereby causing the outer edge of the workpiece to lie along a straight line of predetermined length.

2. A method of positioning a stretchable workpiece comprising the steps of:
    (a) distorting a resilient pre-stretched lamellar member in a transverse direction towards an outer edge of the workpiece;
    (b) aligning the workpiece and the distorted member so that the latter is in superimposable non-contacting relationship with the former;
    (c) contacting the workpiece with the distorted lamellar member so that it adheres thereto; and
    (d) allowing the distorted lamellar member to revert to its original state thereby causing the outer edge of the workpiece to lie along a straight line of predetermined length.

3. A method according to claim 1 further comprising the additional step of stretching the lamellar member in a longitudinal direction after it has reverted to its original state.

4. A method according to claim 1 further comprising bringing the outer edge of the workpiece into joining relationship with an outer edge of a further workpiece.

5. A method of positioning a stretchable sheet workpiece comprising the steps of:
    (a) sensing the shape of an outer edge of the workpiece;
    (b) aligning the workpiece with a resilient pre-stretched lamellar member so as to be in a superimposable non-contacting relationship therewith;
    (c) distorting the lamellar member in a transverse direction towards the outer edge of said workpiece and in accordance with said sensed shape;

(d) contacting the workpiece with the distorted lamellar member so that it adheres thereto; and
(e) allowing the distorted lamellar member to revert to its original state thereby causing the outer edge of the workpiece to lie along a straight line of predetermined length.

6. A method of positioning a stretchable sheet workpiece comprising the step of:
(a) sensing the shape of an outer edge of the workpiece;
(b) distorting a resilient pre-stretched lamellar member in a transverse direction towards the outer edge of the workpiece;
(c) aligning the workpiece and the distorted member so that the latter is in superimposable non-contacting relationship with the former;
(d) contacting the workpiece with the distorted lamellar member so that it adheres thereto; and
(e) allowing the distorted lamellar member to revert to its original state thereby causing the outer edge of the workpiece to lie along a straight line of predetermined length.

7. A method according to claim 5 further comprising stretching the lamellar member when it has reverted to its original state to thereby stretch said workpiece.

8. A method according to claim 5 further comprising bringing the outer edge of the workpiece into joining relationship with an outer edge of a further workpiece.

9. A method of joining stretchable sheet workpieces comprising the steps of:
(a) aligning one of the workpieces with a resilient pre-stretched lamellar member so as to be in a superimposable non-contacting relationship therewith;
(b) distorting the lamellar member in a transverse direction towards an outer edge of said one workpiece;
(c) contacting said one workpiece with the distorted lamellar member so that it adheres thereto;
(d) allowing the distorted lamellar member to revert to its original state thereby causing the outer edge of said one workpiece to lie along a straight line of predetermined length;
(e) treating the other workpiece so that the outer edge of said other workpiece lies along a straight line of predetermined length;
(f) bringing said outer edges of the workpieces into joining relationship and
(g) joining said outer edges of the workpieces.

10. A method according to claim 9 further comprising sensing the shape of the outer edge of each workpiece and distorting the lamellar members in accordance with the associated sensed shape.

11. A method according to claim 9, wherein the other workpiece is treated in the same way as the said one workpiece to cause its outer edge to lie along a straight line.

12. A method of joining stretchable sheet workpieces comprising the steps of:
(a) distorting a resilient pre-stretched lamellar member in a transverse direction towards an outer edge of one of the workpieces;
(b) aligning said one workpiece with the distorted member so that the latter is in superimposable non-contacting relationship with the former;
(c) contacting said one workpiece with the distorted lamellar member so that it adheres thereto;
(d) allowing the distorted lamellar member to revert to its original state thereby causing the outer edge of said one workpiece to lie along a straight line of predetermined length;
(e) treating the other workpiece so that the outer edge of said other workpiece lies along a straight line of predetermined length; and
(f) joining the outer edges of the workpieces.

13. A method according to claim 12, wherein the other workpiece is treated in the same way as said one workpiece to cause its outer edge to lie along a straight line.

14. An apparatus for positioning a stretchable sheet workpiece, said apparatus comprising:
(a) a working table for receiving the workpiece;
(b) at least one carriage assembly;
(c) means for mounting said carriage assembly for movement relative to said table;
(d) a resilient pre-stretchable lamellar member carried by said assembly and having an outer surface adapted to adhere to the workpiece;
(e) means for displacing said lamellar member towards the table to bring said outer surface into contact with said workpiece; and
(f) a template for distorting the lamellar member in a transverse direction towards an outer edge of said workpiece, said template having a working edge corresponding in shape to the outer edge of said workpiece.

15. An apparatus according to claim 14, wherein two carriage assemblies are provided.

16. An apparatus according to claim 14, wherein the outer surface of said lamellar member is provided with gripping elements.

17. An apparatus according to claim 14, wherein the lamellar member is in the form of an endless belt entrained around rollers.

18. An apparatus according to claim 17, wherein one of the rollers is mounted for movement relative to the other roller to effect stretching of the belt.

19. An apparatus according to claim 14, further comprising stop members extending vertically to abut the outer edge of the lamellar member adjacent the outer edge of the workpiece.

20. An apparatus according to claim 16, wherein the working surface of the template can be altered in shape.

References Cited

UNITED STATES PATENTS

| | | | |
|---|---|---|---|
| 3,007,223 | 11/1961 | Wehrmann | 26—18.6 |
| 3,077,656 | 2/1963 | Mahlo | 26—51.5 |
| 3,182,412 | 5/1965 | Bono | 112—148X |
| 3,336,644 | 8/1967 | Dusenbury et al. | 26—18.6 |
| 3,377,967 | 4/1968 | Szentkuti et al. | 112—153 |
| 3,471,363 | 10/1969 | Schmidt | 26—18.6X |

FOREIGN PATENTS

| | | | |
|---|---|---|---|
| 1,217,325 | 5/1966 | Germany | 26—51.3 |
| 416,905 | 9/1934 | Great Britain | 26—51.3 |
| 955,363 | 4/1964 | Great Britain | 26—18.6 |

MERVIN STEIN, Primary Examiner

U.S. Cl. X.R.

26—18.6; 112—153